(12) United States Patent
Yamate

(10) Patent No.: US 7,416,689 B2
(45) Date of Patent: Aug. 26, 2008

(54) CHEMILUMINESCENT COMPOSITION

(75) Inventor: Tetsuro Yamate, Koga (JP)

(73) Assignee: Lumica Corporation, Koga (JP)

( * ) Notice: Subject to any disclaimer, the term of this patent is extended or adjusted under 35 U.S.C. 154(b) by 232 days.

(21) Appl. No.: 10/820,844

(22) Filed: Apr. 9, 2004

(65) Prior Publication Data

US 2004/0238803 A1  Dec. 2, 2004

(30) Foreign Application Priority Data

Apr. 14, 2003  (JP) .............................. 2003-108501

(51) Int. Cl.
  *C09K 11/00* (2006.01)
  *C09K 3/00* (2006.01)
  *F21K 2/00* (2006.01)
(52) U.S. Cl. ........................... 252/700; 362/34; 43/17.6
(58) Field of Classification Search ................. 252/700; 362/34; 43/17.6
  See application file for complete search history.

(56) References Cited

U.S. PATENT DOCUMENTS 3,560,395 A * 2/1971 Crigg .................... 252/186.23
3,701,738 A * 10/1972 Roberts et al. .............. 252/700
3,729,426 A * 4/1973 Zweig et al. ................ 252/700
5,597,517 A * 1/1997 Chopdekar et al. .......... 252/700
6,126,871 A  10/2000 Cranor
2003/0102467 A1  6/2003 Cranor

FOREIGN PATENT DOCUMENTS

WO   WO 94/19421 A   9/1994

* cited by examiner

Primary Examiner—Daniel S Metzmaier
(74) Attorney, Agent, or Firm—Westerman, Hattori, Daniels & Adrian, LLP.

(57) ABSTRACT

The present invention provides a chemiluminescent composition including an oxalate and a fluorescent material wherein the chemiluminescent composition is mixed with a composition including hydrogen peroxide to induce chemiluminescence. The chemiluminescent composition comprises a solvent for the oxalate and the fluorescent material, which includes an acetyl citrate ester or an organic solvent containing an acetyl citrate ester. As an alternative to dibutyl phthalate which is suspected to be one of endocrine disrupting chemicals, the solvent of the present invention can assure safety to human body while maintaining excellent storage stability and luminescent performance.

10 Claims, No Drawings

CHEMILUMINESCENT COMPOSITION

FIELD OF THE INVENTION

The present invention relates to a chemiluminescent composition comprising a new solvent alternative to dibutyl phthalate which has been used as an organic solvent of a chemiluminescent material.

BACKGROUND OF THE INVENTION

A number of inventions concerning a chemiluminescent composition have been made as disclosed, for example, in Japanese Patent Publication No. S53-47798. A typical organic solvent used in these inventions is dibutyl phthalate, which is actually employed as a solvent for bar-shaped chemiluminescent devices in the marketplace. Dibutyl phthalate has been selected from various solvents because it assures a sufficient solubility of an oxalate ester and provides an excellent luminescent performance and storage stability. In late years, dibutyl phthalate, however, is suspected to be one of endocrine disrupting chemicals, and some countries have banned or move toward banning the use thereof.

SUMMARY OF THE INVENTION

It is an object of the present invention to provide a chemiluminescent composition comprising an organic solvent alternative to dibutyl phthalate, capable of assuring safety to human body while maintaining excellent storage stability and luminescent performance.

In order to achieve this object, the present invention, provides a chemiluminescent composition including an oxalate and a fluorescent material wherein the chemiluminescent composition is mixed with a composition including hydrogen peroxide to induce chemiluminescence. The chemiluminescent composition comprises a solvent for the oxalate ester and the fluorescent material, which includes an acetyl citrate ester or an organic solvent containing an acetyl citrate ester.

The present invention also provides a chemiluminescent composition comprising a solvent for the oxalate ester and the fluorescent material, which includes an acetyl citrate ester and a benzoate.

The chemiluminescent composition according to the present invention can assure safety to human body while maintaining excellent storage stability and luminescent performance.

Other features and advantages of the present invention will be apparent from the detailed description.

DESCRIPTION OF THE PREFERRED EMBODIMENT

An oxalate as one of components of a chemiluminescent composition typically includes bis (2,4,5-trichloro-6-carbobutoxyphenyl) oxalate and bis (2,4,5-trichloro carbopentoxyphenyl) oxalate (hereinafter referred to as "CPPO" for brevity). An organic solvent to be contained in the chemiluminescent composition is required to have safety to human body and allow CPPO to be dissolved therein in a desired concentration. As a result of various experimental tests, it has been found that acetyl citrate esters are desirable as the solvent. The safety of acetyl tributyl citrate as typical one of acetyl citrate esters will be described below. Acetyl tributyl citrate (hereinafter referred to as "ATBC" for brevity) is prepared by producing tributyl citrate through an esterification reaction between citric acid and butanol, and then acetylating the tributyl citrate with acetic anhydride to block the OH group thereof.

TABLE 1

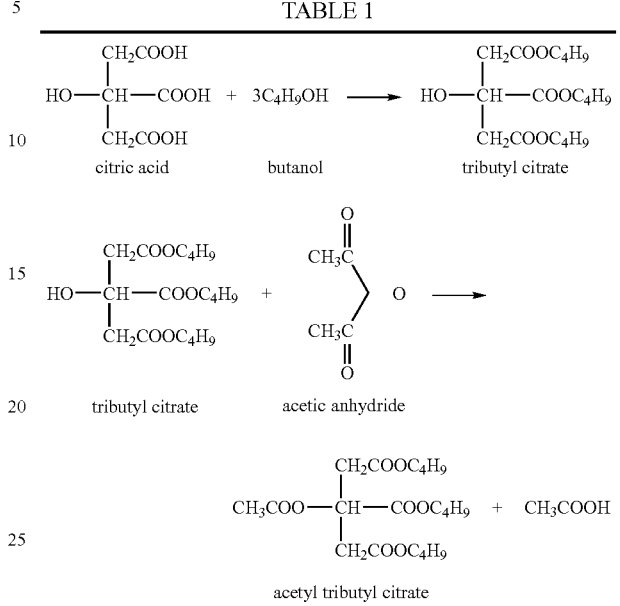

Since a long time ago, acetyl tributyl citrate has been well established as a plasticizing material for use in food industries. As seen from the above reaction formula in Table 1, the citric acid for use in the esterification reaction is a material separated from a food (corns at present), and the butanol and acetic acid are alcohol and vinegar, respectively. Thus, acetyl tributyl citrate is highly safe to human body. In the B. P. S. second report of the United Kingdom, the toxicity coefficient T of acetyl tributyl citrate is evaluated as 100, which means the highest safety factor. U.S. Food and Drug Administration (FDA) also recognizes the safety of acetyl tributyl citrate (FDA. No. 175.105, 175.300, 175.320, 178.3910, 181.27). The PL authorization No. of acetyl tributyl citrate from Japan Hygienic PVC Association is B-4-(3).

CPPO is dissolved at about 0.083 mol/L in acetyl tributyl citrate, and at 0.041 mol/L in acetyl triethyl citrate. A chemiluminescent composition comprising this solvent could provide a satisfactory luminescent performance.

Two kinds of chemiluminescent compositions were prepared by using dibutyl phthalate and ATBC as a solvent. Table 2 shows the respective luminescent performances of the chemiluminescent compositions.

[Preparation of Sample 1]

0.007 mol of 1-chloro bis(phenylethynyl)anthracene (hereinafter referred to as "1-c BPEA" for brevity) and 0.083 mol of CPPO were added to 1 L of dibutyl phthalate, and dissolved therein under heating.

[Preparation of Sample 2]

0.007 mol of 1-c BPEA and 0.083 mol of CPPO were added to 1 L of acetyl tributyl citrate (ATBC), and dissolved therein under heating.

Then, 0.42 cc of oxidizing liquid was added to and mixed with 0.84 cc of solution of Sample 1 to induce luminescence. In the same way, 0.42 cc of oxidizing liquid was added to and mixed with 0.84 cc of solution of Sample 2 to induce luminescence.

TABLE 2

Luminescent Time and Luminescent Intensity

| | lapsed time (minute) | | | | | | | |
|---|---|---|---|---|---|---|---|---|
| | 2 | 15 | 60 | 120 | 180 | 240 | 300 | 360 |
| Sample 1 with dibutyl phthalate solution | 37060 | 24160 | 13420 | 6754 | 3150 | 1648 | 797 | 451 |
| Sample 2 with ATBC solution | 35640 | 21960 | 12200 | 6140 | 3030 | 1600 | 810 | 480 |

Measurement at 23° C.
Luminescent Intensity: candela (mcd/m$^2$) (measured by a luminance meter available from Minolta Camera Co., Ltd., Japan)

The oxidizing liquid used for Samples 1 and 2 had the following composition.

[Preparation of Oxidizing Liquid]

100 cc of t-butanol was added to 400 cc of acetyl triethyl citrate, and hydrogen peroxide solution having a concentration of 85% was added thereto at 5% by weight. Then, 0.0008 mol/L of sodium salicylate was added to the solution, and dissolved therein.

In the above measurement, while the respective luminescent intensities of Samples 1 and 2 were slightly different from one another in numerical value, no difference could be observed by the naked eye. The similar luminescent intensities were obtained when acetyl tributyl citrate in the above oxidizing liquid was substituted with dibutyl phthalate.

In a conventional chemiluminescent composition, CPPO is dissolved in a solvent of dibutyl phthalate at a slightly higher concentration of 0.13 to 0.16 mol/L than that in Samples 1 and 2. While CPPO may be dissolved under heating in acetyl tributyl citrate at such a higher concentration, it can be crystallized and deposited depending on temperature during a long-term storage in the form of a product in some cases. Thus, it is preferable to add an aromatic compound such as toluene or xylene, ketone such as acetone, or an organic solvent such as benzoate, to provide a sufficient solubility. For example, it has been verified that CPPO is sufficiently dissolved in acetyl tributyl citrate adding with benzyl benzoate among benzoate. More specifically, a solvent consisting of 80% by volume of ATBC and 20% by volume of benzyl benzoate allows CPPO to be dissolved therein at about 0.188 mol/L. A solvent consisting of 70% by volume of ATBC and 30% by volume of benzyl benzoate allows CPPO to be dissolved therein at about 0.226 mol/L. A solvent added with butyl benzoate as a substitute for benzyl benzoate exhibits substantially the same tendency in solubility.

A solvent for a component containing hydrogen peroxide may be arranged to allow hydrogen peroxide having a concentration of 80 to 90% to be dissolved in 1 L of the solvent at 1 to 8% by weight. For example, one or more of acetyl citrate ester, citrate ester, ethyl benzoate, dimethyl phthalate, methyl benzoate, t-butanol, ethyl acetate and diethyl ether may be used in combination. A catalyst such as sodium salicylate may be added to this solvent.

Table 3 shows luminescent performances when the amount of benzyl benzoate to be added to ATBC is gradually increased.

In Table 3, a composition A comprises a solvent consisting only of ATBC.

Compositions B, C, D, E, F, G, H, I and J comprise solvents consisting of ATBC and 10%, 20%, 30%, 40%, 50%, 60%, 70%, 80% and 90% by volume of benzyl benzoate added thereto, respectively.

A composition K comprises a solvent consisting only of benzyl benzoate.

TABLE 3

Luminescent Time and Luminescent Intensity

| com-position | lapsed time (minute) | | | | | | | |
|---|---|---|---|---|---|---|---|---|
| | 2 | 15 | 60 | 120 | 180 | 240 | 300 | 360 |
| A | 35220 | 20600 | 11200 | 6630 | 4580 | 3560 | 2620 | 2390 |
| B | 35570 | 20000 | 11250 | 7150 | 4830 | 3890 | 2760 | 2470 |
| C | 32320 | 18730 | 10680 | 6520 | 4940 | 3840 | 2660 | 2100 |
| D | 32800 | 17260 | 10380 | 6780 | 4920 | 3950 | 3050 | 2480 |
| E | 31220 | 17710 | 10240 | 6780 | 4780 | 4000 | 3000 | 2620 |
| F | 29630 | 16130 | 9690 | 5460 | 4420 | 3600 | 2780 | 2400 |
| G | 27560 | 15470 | 8100 | 5540 | 3900 | 3380 | 2700 | 2280 |
| H | 27450 | 14980 | 9150 | 5420 | 4060 | 2970 | 2430 | 1990 |
| I | 26660 | 13520 | 8820 | 5180 | 3700 | 2770 | 2250 | 1810 |
| J | 25540 | 14050 | 8380 | 4950 | 3290 | 2360 | 1900 | 1490 |
| K | 24950 | 13720 | 8010 | 4560 | 2950 | 2000 | 1580 | 1180 |

Measurement at 23° C.
Luminescent Intensity: candela (mcd/m$^2$)

Each of the above compositions was prepared by adding 0.164 mol/L of CPPO and 0.0074 mol/L of 1-c BPEA to the solvent. Then, the measurement data were obtained by adding 0.42 cc of oxidizing liquid to 0.84 cc of each of the prepared solutions. The oxidizing liquid was the same as that used for Samples 1 and 2. The similar luminescent intensities were obtained when dimethyl phthalate was used as the solvent for this oxidizing liquid.

Table 4 shows luminescent performances when the amount of butyl benzoate to be added to ATBC is gradually increased.

In Table 4, a composition L comprises a solvent consisting only of ATBC.

Compositions M, N, O, P, Q, R, S, T and U comprise solvents consisting of ATBC and 10%, 20%, 30%, 40%, 50%, 60%, 70%, 80% and 90% by volume of butyl benzoate added thereto, respectively.

A composition V comprises a solvent consisting only of butyl benzoate.

TABLE 4

Luminescent Time and Luminescent Intensity

| com-position | lapsed time (minute) | | | | | | | |
|---|---|---|---|---|---|---|---|---|
| | 2 | 15 | 60 | 120 | 180 | 240 | 300 | 360 |
| L | 34070 | 18790 | 9890 | 7730 | 4140 | 3700 | 2940 | 2400 |
| M | 34870 | 20240 | 10400 | 7140 | 4100 | 3790 | 2920 | 2380 |
| N | 33620 | 20090 | 10730 | 7030 | 4690 | 3890 | 3090 | 2530 |
| O | 32640 | 19570 | 9560 | 6890 | 4330 | 3730 | 2870 | 2050 |
| P | 30730 | 19140 | 10830 | 7760 | 4720 | 4000 | 3120 | 2450 |
| Q | 29710 | 18250 | 10270 | 7350 | 4530 | 3550 | 2930 | 2330 |
| R | 28640 | 17990 | 10470 | 6480 | 4620 | 3870 | 3040 | 2460 |

TABLE 4-continued

Luminescent Time and Luminescent Intensity

| com-position | lapsed time (minute) | | | | | | | |
|---|---|---|---|---|---|---|---|---|
| | 2 | 15 | 60 | 120 | 180 | 240 | 300 | 360 |
| S | 28070 | 17460 | 9920 | 6070 | 4120 | 3640 | 2650 | 2310 |
| T | 26570 | 17340 | 9750 | 6360 | 4290 | 3830 | 2710 | 2330 |
| U | 25130 | 16730 | 9480 | 5880 | 4070 | 3580 | 2660 | 2130 |
| V | 25820 | 14640 | 9170 | 5850 | 4160 | 3620 | 2750 | 2300 |

Measurement at 23° C.
Luminescent Intensity: candela (mcd/m$^2$)

Each of the above compositions was prepared by adding 0.164 mol/L of CPPO and 0.0074 mol/L of 1-c BPEA to the solvent. Then, the measurement data were obtained by adding 0.42 cc of oxidizing liquid to 0.84 cc of each of the prepared solutions. The oxidizing liquid was the same as that used for Samples 1 and 2. The similar luminescent intensities were obtained when dimethyl phthalate was used as the solvent for this oxidizing liquid.

As seen in Tables 3 and 4, the luminescent intensity is gradually reduced as the amount of benzyl benzoate or butyl benzoate is increased.

In view of the primary purpose of the present invention or providing a solvent which is highly safe to human body, it is desired that the solvent consists only of ATBC or consists of ATBC and 10 to 30% by volume of benzyl benzoate or butyl benzoate added thereto. For example, in preparing a solution containing CPPO at a concentration of 0.13 mol, it is effective to add 10 to 20% by volume of benzyl benzoate thereto. In preparing a solution containing CPPO at a concentration of 0.16 mol, it is effective to add 20 to 30% by volume of benzyl benzoate thereto.

Table 5 shows results of tests for checking a long-term degradation of the composition D comprising the solvent consisting of ATBC and 30% by volume of benzyl benzoate added thereto.

In Table 5, a test result A was obtained by measuring luminescent intensities just after the preparation of the composition D, wherein the test result was obtained by adding 0.42 cc of the oxidizing liquid used for Samples 1 and 2 to 0.84 cc of the solution having the composition D.

Test results B and C were obtained by measuring luminescent intensities after the above composition D was hermetically stored in a glass container at 60° C., respectively, for 2 and 4 weeks.

TABLE 5

Luminescent Time and Luminescent Intensity

| test | lapsed time (minute) | | | | | | | |
|---|---|---|---|---|---|---|---|---|
| | 2 | 15 | 60 | 120 | 180 | 240 | 300 | 360 |
| A | 32800 | 17260 | 10380 | 6780 | 5200 | 4000 | 3050 | 2480 |
| B | 30910 | 17150 | 10250 | 6710 | 4920 | 3950 | 3030 | 2430 |
| C | 30420 | 16270 | 9470 | 5940 | 4390 | 3470 | 2760 | 2170 |

Luminescent Intensity: candela (mcd/m$^2$)

As compared to the test result A, the luminescent intensity after 2 minutes is deteriorated about 6% in the test result B for the composition D stored at 60° C. for 2 weeks, and only about 7% even in the test result C for the composition D stored at 60° C. for 4 weeks. It is generally described that the condition of storing at 60° C. for 4 weeks is equivalent to storage at normal temperatures for 2 years. Thus, the test results show that the composition D has practically sufficient storage stability.

As described above, ATBC can be used as a primary component of a solvent for the oxalate and the fluorescent material in the chemiluminescent composition to provide an excellent luminescent performance and storage stability. As for a solvent for the oxidizing liquid, acetyl triethyl citrate may be used, but not sufficient in terms of storage stability. Through various researches, it was experimentally verified that ethylene glycol monoalkyl ether acetate and diethylene glycol monoalkyl ether acetate can be used as the solvent to provide excellent storage stability. A specific example of these esters includes ethylene glycol monobutyl ether acetate ($CH_3COO$ $CH_2$—$CH_2OC_4H_9$), and diethylene glycol monobutyl ether acetate ($CH_3COO$ $CH_2CH_2OCH_2CH_2OC_4H_9$). The former and latter will hereinafter be referred to as "EGMBA" and "DEGMBA", respectively.

One example of preparing the oxidizing liquid using EGMBA will be described below.

100 cc of t-butanol was added to 400 cc of EGMBA, and then 85% hydrogen peroxide was added to the obtained mixture at 5 weight %. Then, sodium salicylate was added to the mixture at 0.0008 mol/L, to obtain an oxidizing liquid.

The obtained oxidizing liquid was hermetically stored in a glass vessel at 60° C. for 2 weeks. Then, 0.42 cc of the oxidizing liquid was added to 0.84 cc of the composition D in Table 3, which comprises a solvent consisting of ATBC and 30 weight % of benzyl benzoate added thereto (CPPO: 0.164 mol/L, 1-CBPEA: 0.0074 mol/L), to measure luminescent intensity.

TABLE 6

| | Luminescent Time and Luminescent Intensity | | | | | | | |
| --- | --- | --- | --- | --- | --- | --- | --- | --- |
| | lapsed time (minute) | | | | | | | |
| solvent | 2 | 15 | 60 | 120 | 180 | 240 | 300 | 360 |
| dimethyl phthalate | 34070 | 18565 | 10656 | 7067 | 4982 | 4252 | 3244 | 2565 |
| EGMBA | 46032 | 21342 | 10849 | 6670 | 4497 | 3740 | 2788 | 2179 |

Measurement temperature: 23° C.
Luminescent Intensity: candela (mcd/m$^2$) (measured using a luminance meter made by Minolta Co., Ltd.)

Similar measurement values could be obtained by an oxidizing liquid containing DEGMBA. Just for reference, DEGMBA should be regardfully handled because the inhalation of this solvent is likely to cause undesirable symptoms, such as cephalalgia.

Table 6 also shows a measurement result in case where dibutyl phthalate is used as the solvent for the oxidizing liquid. As seen in the comparison between these two solvents, EGMBA and DEGMBA can be used instead of dibutyl phthalate to obtain substantially the same luminescent performance.

Thus, both solvents for two chemiluminescent compositions: the first composition including an oxalate ester and a fluorescent material and the second composition including hydrogen peroxide, can be prepared without using dibutyl phthalate or demethyl phthalate, to provide a safer product to human body.

As mentioned above, the present invention can provide a chemiluminescent composition capable of assuring safety to human body while maintaining excellent storage stability and luminescent performance.

What is claimed is:

1. A chemiluminescent composition,
   an oxalate;
   a fluorescent material;
   an acetyl tributyl citrate at an amount of 70% by volume or more; and
   benzyl benzoate or butyl benzoate at an amount of 30% by volume or less,
   wherein the chemiluminescent composition induces chemiluminescence when being mixed with an oxidizing composition comprising hydrogen peroxide.

2. A chemiluminescent components according to claim 1, wherein the oxidizing is (2,4,5-trichlorocarbopentoxyphenyl)oxalate.

3. A chemiluminescent components according to claim 1, wherein the oxidizing composition further comprises t-butanol and at least one of ethylene glycol monobutyl ether acetate and diethylene glycol monobutyl ether acetate.

4. A chemiluminescent composition according to claim 1, wherein the acetyl tributyl citrate is included at an amount of 90 volume % or more in the organic solvent included in the chemiluminescent composition.

5. A chemiluminescent composition according to claim 1, wherein benzyl benzoate is comprised at an amount of 30% by volume or less.

6. A chemiluminescent components, comprising:
   a first component, comprising:
      an oxalate;
      a fluorescent material;
      an acetyl tributyl citrate at an amount of 70% by volume or more; and
      benzyl benzoate or butyl benzoate at an amount of 30% by volume or less, a second component separated from the first component, comprising:
      hydrogen peroxide.

7. A chemiluminescent components according to claim 6, wherein the oxalate is (2,4,5-trichlorocarbopentoxyphenyl)oxalate.

8. A chemiluminescent components according to claim 6, wherein the second component further comprises t-butanol and at least one of ethylene glycol monoalkyl ether acetate and diethylene glycol monoalkyl ether acetate.

9. A chemiluminescent composition according to claim 6, wherein the acetyl tributyl citrate is included at an amount of 90 volume % or more in the organic solvent included in the chemiluminescent composition.

10. A chemiluminescent composition according to claim 6, wherein the first component comprises the benzyl benzoate at an amount of 30% by volume or less.

* * * * *